United States Patent [19]
Gouge

[11] Patent Number: 5,040,225
[45] Date of Patent: Aug. 13, 1991

[54] IMAGE ANALYSIS METHOD
[75] Inventor: James O. Gouge, Phoenix, Ariz.
[73] Assignee: GDP, Inc., Lakewood, Colo.
[21] Appl. No.: 129,274
[22] Filed: Dec. 7, 1987
[51] Int. Cl.[5] ............................................. G06K 9/00
[52] U.S. Cl. ......................................... 382/6; 382/28; 128/660.04; 358/112
[58] Field of Search ................. 382/6, 28; 128/660.04, 128/661.02, 662.02, 916; 358/112

[56] References Cited
U.S. PATENT DOCUMENTS

| | | | |
|---|---|---|---|
| 4,176,658 | 12/1979 | Kossoff et al. | 128/660.04 |
| 4,229,797 | 10/1980 | Ledley | 382/28 |
| 4,423,737 | 1/1984 | Yano et al. | 128/660.04 |
| 4,617,682 | 10/1986 | Mori et al. | 382/28 |
| 4,773,425 | 9/1988 | Saitou | 128/660.04 |

Primary Examiner—Leo H. Boudreau
Assistant Examiner—Michael Razavi
Attorney, Agent, or Firm—Beaton & Swanson

[57] ABSTRACT

A method and device for interpreting and processing medical ultrasound and other video images. The mix of reflection coefficients in pixel windows is measured by determining the range and distribution of pixel gray scale values to establish an "echoic texture," which can be scaled or used to color the image to facilitate identification of tissue characteristics. The image may also be processed by a variety of enhancement methods including processes for contour following, edge and contrast enhancement, smoothing and noise abatement. Processing times are reduced by limiting certain processes to pixels established by a line drawing in machine memory identifying pixel patterns characteristic of element edges. The results of processing from consecutive images may be compared and aberrant results may be corrected.

5 Claims, 5 Drawing Sheets

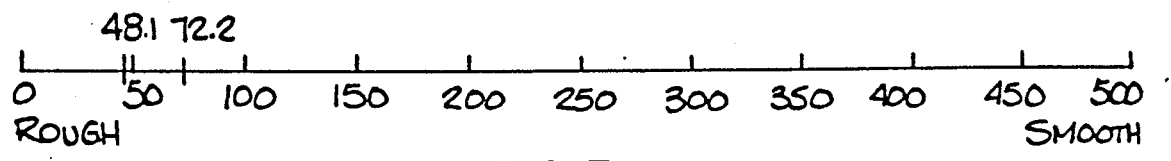
FIG. 3
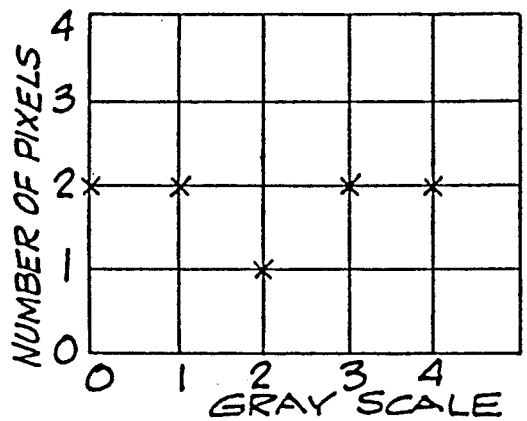
FIG. 4
FIG. 6
FIG. 5
FIG. 7

| 10 | 11 | 13 |
|----|----|----|
| 14 | 14 | 13 |
| 10 | 11 | 12 |

| 9  | 8  | 7  | 7  |
|----|----|----|----|
| 10 | 28 | 9  | 8  |
| 9  | 7  | 10 | 10 |

| 8 | 5 | 7 | 22 | 24 | 21 | 15 | 18 | 19 |

IMAGE ANALYSIS METHOD

BACKGROUND OF THE INVENTION

The present invention relates to a process and device for quantifying, analyzing, interpreting, enhancing and representing in computer generated image format, medical ultrasound and other video images. These functions can be divided into two categories, image processing and image analysis. Image processing functions include image enhancement and presentation. Image analysis functions include quantifying, analyzing and interpreting the characteristics of the enhanced or unenhanced image.

Images generated by medical ultrasound scanning devices present unique problems for image process and analysis systems. Ultrasonic scanning devices use sound transducers to introduce high frequency sonic waves into the body, either through a hand-held device pressed against the body or through a specially designed transducer inserted into a body cavity such as a rectal cavity. Elements in the body reflect the sonic waves back to the transducer according to the reflection coefficients of the elements. The measured time between emission and detection of the sonic waves is proportional to the depth of the sonic wave reflecting element within the body. A visually projectable image of the reflective elements in a plane of the body can be generated by assigning reflected wave signals a gray scale value in proportion to the reflected wave amplitude, passing the signals through a variable gain amplifier to compensate for attenuation losses as the wave reflecting elements increase in depth, and displaying the results in two dimensions. The two dimensional display corresponds to a plane in the body parallel to the direction of wave travel. Bodily elements in the display can be recognized by trained observers. The display can be a moving image by generating and displaying a series of repeated images on a video monitor. This process of generating and interpreting images using ultrasonic transducers and processing means is known as sonography.

The reflective characteristics of wave reflecting elements in the body are referred to in sonography as the "echogenicity" of that area of the body. A highly reflective element would appear bright in the image and is called "hyperechoic," while an element with low reflectivity would appear dark and is called "anechoic." The mixture of hyperechoic and anechoic features in a localized area is termed the "echoic texture" of that area. A uniform set of features with similar reflective coefficients is called "isoechoic." A non-uniform set of features with a broad mix of reflective coefficients, which would appear as a speckled pattern in the image, is called "hypoehoic."

The primary cause of the speckled pattern in the image is that sonic waves do not always follow a direct path from and to the transducer, but instead may be reflected off several curved or angular reflecting surfaces causing small variations in the amplitude of the reflected wave. Since the displayed gray scale value of each "pixel" (picture element) is derived from the amplitude of the reflective wave, this variation produces speckle similar in appearance to snow in a standard television image. Although speckle is not random as is snow in a standard television image, the exact form of speckle in an ultrasound image is virtually impossible to predict because of the extraordinarily complex configuration of body tissues.

Speckle accounts for over 90% of the contents of many ultrasound images, and has been considered a major cause of the poor quality of those images. Because speckle clouds the image and resembles snow in a television image, it is treated as noise. However, from the explanation above, it can be seen that the characteristics of speckle directly relate to the physical and echoic structure of the tissue being scanned. Thus, existing methods that suppress speckle also suppress valuable information regarding the tissue.

For example, it has been found that the several regions of cancerous tumors of the prostate gland have fairly characteristic echoic textures during the various growth stages. This phenomena is discussed somewhat in a scholarly article entitled "The Use of Transrectal Ultrasound in the Diagnosis, Guided Biopsy, Staging and Screening of Prostate Cancer," published in Volume 7, Number 4 of RadioGraphics, July, 1987. However, prior to the present invention, ultrasonic images were of a quality and resolution too poor for reliable diagnosis based upon echoic textures. Further, no procedure had been devised for the accurate quantification of echoic texture. Instead, diagnosis relied mainly on the experience of the operator.

Apart from methods for analyzing speckle, there are many existing devices and methods aimed at suppressing noise in video images. These devices and methods are primarily for use in standard television images in which noise is manifested as discreet light or dark random spots a few pixels in diameter. Most of the existing methods and devices are not specifically directed toward the unusual problems encountered in ultrasound images. In fact, these methods often suppress speckle information critical to interpreting and analyzing ultrasound images.

Television noise reduction systems may be broadly classified into two types. One type of system relies on the fact that television noise is generally random and, moreover, is short-lived at any given pixel in the picture. This type of system stores in a machine memory the gray scale value (and chrominance in the case of a color picture) of each pixel in the picture, over a period of time comprising several sequential pictures. The system then compares the gray scale value of each pixel with its gray scale value in immediately preceding and succeeding pictures. In the event the pixel is transmitting noise, then it is likely that the comparison will show an abrupt change in gray scale value in that pixel between adjacent pictures. If the comparison does indeed show a change in excess of a predetermined amount, then the system will alter the gray scale value of the aberrant pixel by an arithmetic or weighted average with its gray scale value in adjacent pictures. Examples of such approaches are described in U.S. Pat. Nos. 4,064,530 by Kaiser, et al.; 4,504,864 by Anastassiou, et al.; 4,539,594 by Illetschko; and 4,485,399 by Schulz, et al.

A problem with these systems is that they depend on the picture content remaining stable for at least a period of several frames. Since standard television video uses 30 frames per second, the picture content must be stable for a tenth of a second or more, depending on the number of frames used in the frame comparison. For example, consider a picture content with a dark object moving from one side of the screen to the other against a light background over a period of one second. If the screen is the standard 512 by 512 pixels, then the border of the dark object will move at the rate of 512 pixels per second. If the system compares 4 frames and each frame appears for the standard 1/30 of a second, then the object will have moved a number of pixels during the four-frame reference period calculated as follows:

$$(1/30) \, 4 \, (512) = 68$$

The object border will be blurred over those 68 pixels because the system will erroneously average the gray scale values of those pixels while they are displaying the object, with the gray scale value of those pixels while they are displaying the background.

Some systems attempt to avoid blurring the borders of objects moving in the picture by suspending the averaging process or altering the weighing of the average during periods of motion in the picture. Such a system is described in U.S. Pat. No. 4,242,705 by Ebihara. However, such approaches necessarily require a diminution in the noise reduction process during the period that the picture is showing motion.

A second approach of existing noise reduction systems relies on the fact that ordinary television noise is generally only a few pixels in diameter and has a high contrast with adjacent pixels. These systems seek to compare the gray scale value of each pixel with the gray scale value of adjacent pixels. If the difference is greater than a predetermined amount, then the system smooths the difference by adjusting the gray scale values of the pixels. The predetermined amount that triggers the adjustment may be varied depending on the overall or localized luminescence of the picture, the degree of motion in the picture, viewer preference and other factors. For example, see U.S. Pat. No. 4,361,853 by Remy, et al.

While these smoothing systems are effective in reducing noise, or at least in reducing high-contrast noise, they have several drawbacks. A serious drawback is that they reduce the contrast between actual objects in the picture as well as reducing the contrast of noise, since they are unable to distinguish between noise and objects. This produces a lack of sharpness in the picture which is particularly noticeable when the picture contains alphanumeric characters or other distinctive objects presented against contrasting backgrounds. A further drawback with smoothing routines is that they operate indiscriminately over the entire picture, regardless of the picture content. This indiscriminate operation requires long processing times and large memory capacities.

BRIEF DESCRIPTION OF THE DRAWINGS

FIG. 3 is a chart showing an example of the range of echoic texture values of the invention, and three echoic texture values determined in hypothetical examples.

FIG. 4 depicts a window of nine pixels with their gray scale values for a hypothetical example of the echoic texture quantification process of an embodiment of the invention.

FIG. 5 is a graph of gray scale values versus number of pixels at that value for the window of pixels shown in FIG. 4.

FIG. 6 depicts a window of nine pixels with their gray scale values for a hypothetical example of the echoic texture quantification process of an embodiment of the invention.

FIG. 7 is a graph of gray scale values versus number of pixels at that value for the window of pixels shown in FIG. 6.

SUMMARY OF THE INVENTION

Existing image processing methods typically suppress image speckle in an effort to create a visually pleasing image. In doing so, much valuable information concerning the echoic texture and other tissue characteristics is suppressed. The present invention takes the opposite approach by including a process for analyzing, quantifying and interpreting image speckle. The resulting data can be related to the echoic texture to predict the tissue characteristics. In particular, the echoic texture can be used to predict pathological conditions such as tumors.

The echoic texture analysis can be done alone or in combination with tissue samples or alternate forms of image enhancement. The invention includes operator-adjustable processes for noise abatement, smoothing, contrast enhancement and edge enhancement. Also described is a process wherein a contour of an image element is followed by seeking characteristic pixel gray scale patterns. Noise pixels interrupting the contour up to a predetermined limit can then be identified and corrected.

Processing times can be greatly reduced by establishing a "line drawing" in machine memory of the edges of the image elements as determined by pixel gray scale value differentials in excess of a predetermined threshold. Other process, such as the contour following process, can then operate on only the pixels of the line drawing rather than all the pixels on the screen.

A process is described for comparison of the results of one or more of the processes among several consecutive images. The comparison may go beyond mere gray scale values by comparing, for example, the results of the contour following or line drawing processes among several consecutive images.

DESCRIPTION OF A PREFERRED EMBODIMENT

Figure 1:
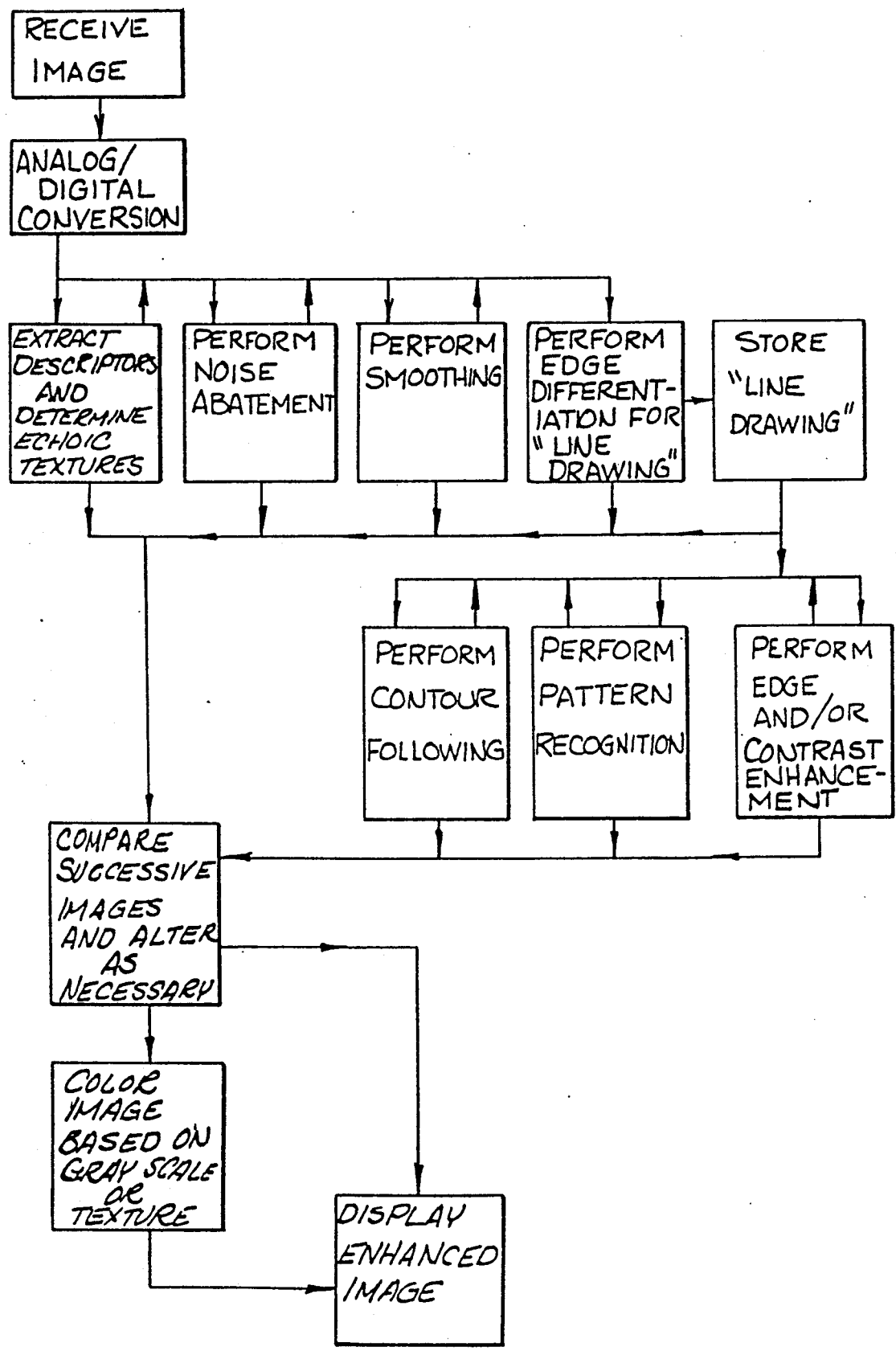
FIG. 1 is a diagrammatical representation of an embodiment of the overall process of the present invention.
Figure 2:
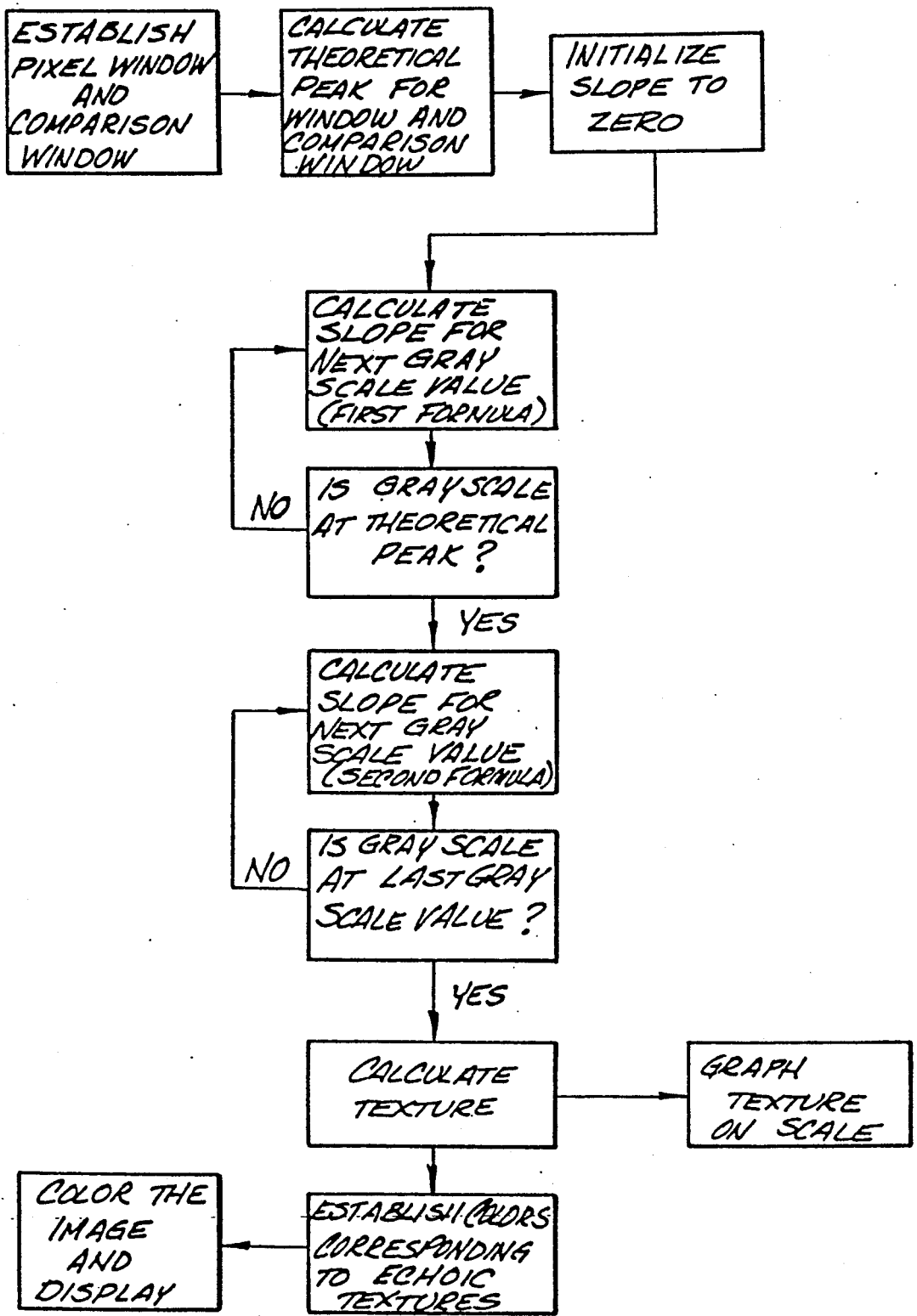
FIG. 2 is a diagrammatical representation of the portion of the invention for quantifying and displaying the echoic texture of an image.

The overall process of the present invention is shown diagrammatically in FIG. 1. Manipulation of a video image through automatic digital processing initially requires converting the analog video signals into digital data. This process is well known in the art. Briefly, it requires assigning each pixel an address (i, j) wherein i represents the vertical axis and j represents the horizontal axis, and a gray scale value from, for example, 1 to 256. The resulting converted digital data is stored in machine memory such as a random access memory.

The stored converted digital data can be processed in any of several methods or any combination of the those methods depending on the symptoms of the patent and the circumstances of the scanning. Those methods and some of the desirable combinations are described below. It should be noted that the precise formulation of the processes for quantifying the echoic texture and enhancing the image may vary somewhat from one ultrasonic device to another, depending on its wavelength and other characteristics. The examples herein assume use with a Bruel & Kjaer Model 1846. Other devices may require their own calibration using known tissue samples.

An important feature of the present invention enables a physician to quantify the echoic texture of features in the image, as depicted in FIGS. 2 through 8. Referring to FIG. 3, the echoic texture may be quantified on a scale of 0 to 500 or some other number, with 0 representing a rough echoic texture with a wide variety of pixel gray scale values and 500 representing a smooth echoic texture such as for liquid. The first step is to examine a discrete window of pixels such as, for a hypothetical example, the 3 by 3 pixel window of FIG. 4 with the gray scale value of each pixel as noted. The echoic texture is given by the following formula:

$$T = (\text{Slope})(Pm - P) \, 100$$

Where
T = Echoic Texture
Slope = Slope of Gray Scale Value versus Pixels
Pm = Theoretical Peak for Comparison Window
P = Theoretical Peak for Examined Window The theoretical peak for the examined window P is the average gray scale value in the window after selectively discounting aberrant pixels. If the number of pixels with a given gray scale value in the window is less than, for example, 3% of the total number of pixels in that window, then those pixels are deemed noise. For example, if the pixel window is 10 by 10 for a total of 100 pixels, and only 2 pixels have a gray scale value of 6, then those two pixels are not considered since 2 is less than 3% of 100. The theoretical peak P is equal to the sum of the products of each gray scale value times the number of pixels with that gray scale value, divided by the number of pixels in the window less the aberrant pixels. The result is rounded to the nearest integer. For the example window of FIG. 4, the theoretical peak would be:

$$P = \frac{(0 \times 2) + (1 \times 2) + (2 \times 1) + (3 \times 2) + (4 \times 2)}{9}$$

$$P = 2$$

The theoretical peak for the comparison window is calculated in the same manner, except that a much larger pixel window is used which includes the examined window. It has been found that a comparison window of at least ten times the area of the examined window is useful for most ultrasound images. For purposes of illustration, it might be assumed that the theoretical peak for the comparison window is 3.

The Slope is a number measuring the distribution of the pixel gray scale values on each side of the theoretical peak of the examined window in the graph of gray scale values versus number of pixels. It is given by the iterative formula:

$$\text{Slope} = \text{Slope} + \frac{\text{Pop}/((P - i) + 1)}{N}$$

Where
Pop = Number of Pixels at Gray Scale Value i
i = Gray Scale Value
N = Number of Significant Pixels in Window
P = Theoretical Peak of the Examined Window The Slope is determined by successive iterations of this formula as the gray scale value goes from the minimum significant value in the window up to and including the theoretical peak. The "Slope" on the right-hand side of the equation is the Slope determined in the previous iteration. An initial slope of zero is used. After the theoretical peak is reached, the formula becomes:

$$\text{Slope} = \text{Slope} + \frac{\text{Pop}/((i - P) + 1)}{N}$$

Where
Pop = Number of Pixels at Gray Scale Value i
i = Gray Scale Value
N = Number of Pixels in Window
P = Theoretical Peak of the Examined Window When the last gray scale entry is reached, the formula has a final Slope number. In the example of FIGS. 4 and 5, the Slope calculation would be as follows:

$$\text{for } i = 0, \text{Slope} = 0 + \frac{2/((2 - 0) + 1)}{9} = .074$$

$$\text{for } i = 1, \text{Slope} = .074 + \frac{2/((2 - 1) + 1)}{9} = .185$$

$$\text{for } i = 2, \text{Slope} = .185 + \frac{1/((2 - 2) + 1)}{9} = .296$$

$$\text{for } i = 3, \text{Slope} = .296 + \frac{2/((3 - 2) + 1)}{9} = .407$$

$$\text{for } i = 4, \text{Slope} = .407 + \frac{2/((4 - 2) + 1)}{9} = .481$$

The texture T would be:

$$T = (\text{Slope})(Pm - P) \, 100$$

$$T = (0.481)(3 - 2)(100) = 48.1$$

Another hypothetical example illustrates the change in the echoic texture number for a window of pixels with a smaller range of gray scales, as shown in FIGS. 6 and 7. In that example, the theoretical peak P rounded to the nearest integer would be:

$$P = \frac{(3 \times 1) + (4 \times 2) + (2 \times 3)}{9}$$

$$P = 2$$

The Slope calculation would be as follows:

$$\text{for } i = 1, \text{ Slope} = 0 + \frac{3/((2-1)+1)}{9} = .167$$

$$\text{for } i = 2, \text{ Slope} = .167 + \frac{4/((2-2)+1)}{9} = .611$$

$$\text{for } i = 3, \text{ Slope} = .611 + \frac{2/((3-2)+1)}{9} = .722$$

The texture T would be:

$$T = (0.722)(3-2)(100) = 72.2$$

This example shows an echoic texture of 72.2, as compared to 48.1 for the previous example. This is a smoother image than the previous image, corresponding to the smaller range of gray scale values in this window of pixels.

The method illustrated with these examples has a further advantage that is not immediately apparent. The echoic texture determined by the method does not change merely as the result of a change in the overall brightness or darkness of the image. Consider the hypothetical example of FIG. 8. The gray scale values of the pixels in this window are identical to those shown in the first example, depicted in FIGS. 4 and 5, except they are exactly 10 points higher in value and are therefore lighter.

The theoretical peak P rounded to the nearest integer is:

$$P = \frac{(2 \times 10) + (2 \times 11) + (1 \times 12) + (2 \times 13) + (2 \times 14)}{9}$$

$$P = 12$$

The Slope is as follows:

$$\text{for } i = 10, \text{ Slope} = 0 + \frac{2/((12-10)+1)}{9} = .074$$

$$\text{for } i = 11, \text{ Slope} = .074 + \frac{2/((12-11)+1)}{9} = .185$$

$$\text{for } i = 12, \text{ Slope} = .185 + \frac{1/((12-12)+1)}{9} = .296$$

$$\text{for } i = 13, \text{ Slope} = .296 + \frac{2/((13-12)+1}{9} = .407$$

$$\text{for } i = 14, \text{ Slope} = .407 + \frac{2/((4-2)+1)}{9} = .481$$

The Texture T is:

$$T = (0.481)(13-12)(100) = 48.1$$

The echoic texture of P=12 is the same echoic texture for the window of pixels in the first example, which were of identical gray scale values but 10 points lower. Therefore, this method gives a flat echoic texture reading regardless of the image brightness.

The process of determining the echoic texture of a pixel window is repeated throughout the image or throughout the selected area of the image being processed under this procedure. The results can then be aggregated and displayed as a new image indicative of echoic texture. Preferably, this is done by assigning different colors to various ranges of echoic texture as further described below in connection with coloring processes.

The method described above uses pixel windows of 3 by 3 pixels for quantifying the gray scale range, and thus the echoic texture, within the window. The system can also be readily adjusted to increase or decrease the size of the pixel window. At one extreme, a very large window would produce meaningless results because such a window would normally have a very broad range of gray scale values indicating many different features in the image. At the other extreme, a window of 2 by 2 would also be difficult to interpret since there is little opportunity for such a small window to show a representative gray scale range. The best approach is a window between these extremes whose size may be adjusted by the operator depending on the size of the features in the image, the image enlargement and the type of elements being sought.

The quantification of echoic texture may be used independently or in combination with one or more image enhancement processes. Those processes allow a high quality visual examination of the tissue cross section, which can aid in interpreting the echoic texture procedure and can further aid in examining the tissue in the traditional manner. Those image enhancement processes are described below.

One of those additional processes is a noise abatement routine. Under this process, the machine examines the gray scale of pixels consecutively across the image from left to right (or in some other continuous direction) and changes the gray scale value of each pixel to match the preceding pixel until the difference in gray scale value between the subject pixel and the gray scale value to which it would be changed exceeds a predetermined amount. Then, the machine does not change that pixel's gray scale value, but instead adopts it as the new presumed gray scale value until another pixel is encountered which would require a gray scale value change greater than the predetermined amount, and so on.

Figures 8, 9, 10, 11:
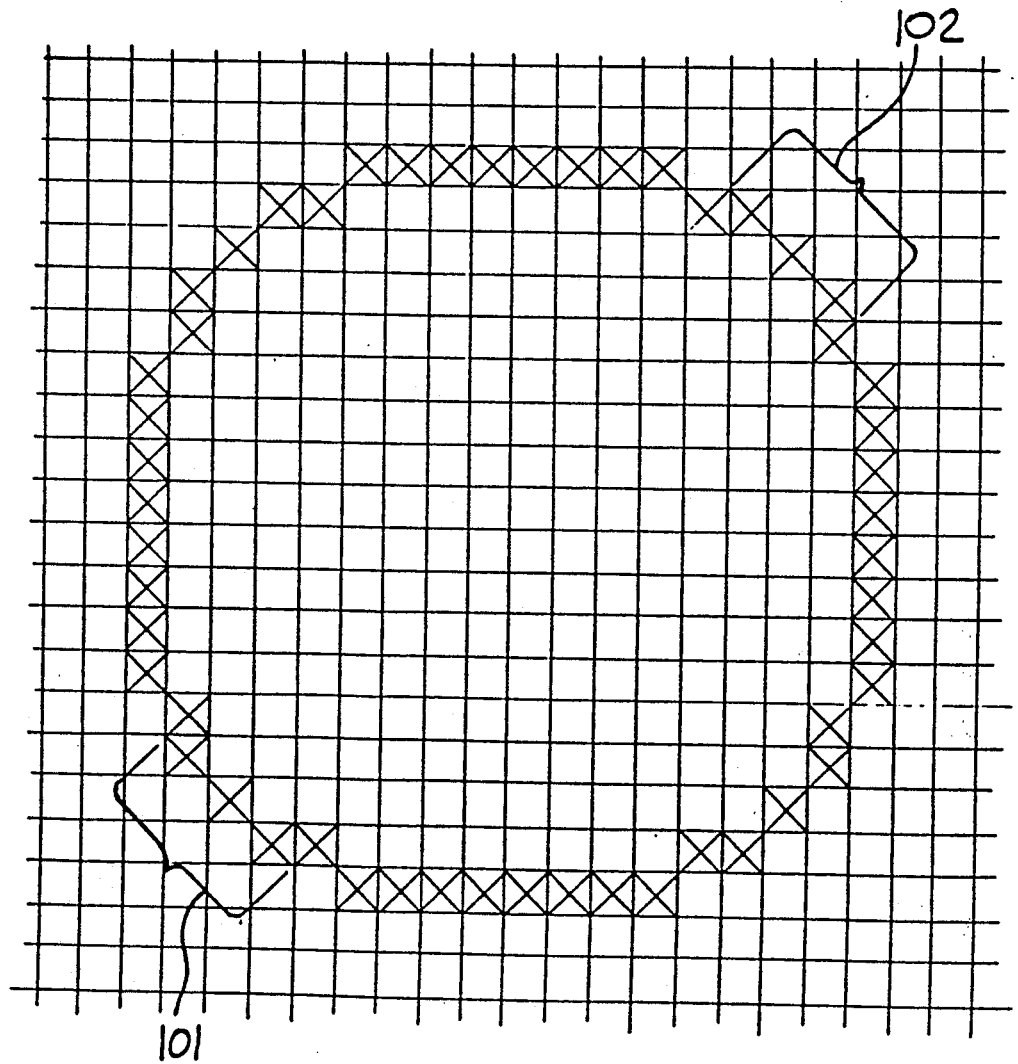
FIG. 8 depicts a window of nine pixels with their gray scale values for a hypothetical example of the echoic texture quantification process of an embodiment of the invention.
FIG. 9 depicts a row of pixels on an image with their gray scale values for a hypothetical example of the noise abatement process of an embodiment of the invention.
FIG. 10 depicts a window of pixels with their gray scale values for a hypothetical example of the smoothing process of an embodiment of the invention.
FIG. 11 depicts a window of pixels showing a circular element for a hypothetical example of the edge of differentiation process of an embodiment of the invention.

A simple example illustrating this noise abatement process is depicted in the row of pixels in FIG. 9. The left-most pixel on the screen has a gray scale value of 8. Thus, the initial presumed pixel gray scale value is 8. Assume the pre-determined amount of difference in gray scale value necessary to establish a new gray scale value is 6. The machine examines the pixel immediately to the right of the first pixel and finds it has a gray scale value of 5. Since 8−5=3 is less than the pre-determined limit of 6, the machine changes the gray scale value of that pixel from 5 to 8. The machine likewise changes the gray scale value of the next pixel from 7 to 8, since 8−7=3 is less than 6.

The next pixel has a gray scale value of 22. Since 22−8=14 is greater than 6, that pixel remains at 22 and the new presumed gray scale value is 22. The next two pixels, with gray scale values of 24 and 21, are changed to 22 since they do not differ from 22 by more than 6. The next pixel remains at 15 since it differs from 22 by more than 6, and the last two are changed to 15 since they do not differ from 15 by more than 6.

This noise abatement process is effective in establishing distinguishable breaks in areas of gradual gray scale transitions. The process is also highly effective in removing low contrast noise, since by definition the difference in gray scale value between the noise and the adjacent pixel is small and probably less than the predetermined value necessary to alter the presumed gray scale value.

The predetermined value necessary to alter the presumed gray scale value (the value of 6 in the preceding example) can be changed by the operator. Of course, high values produce an exceptionally simple and visually appealing image by removing a high proportion of low contrast noise. However, a high value also tends to remove low contrast detail. Thus, the value can be adjusted by an experienced operator to take into account the peculiarities of the image, the tissue and the sought-after image elements.

A further procedure is a smoothing process. This process modifies the gray scale value of each pixel to an average of its gray scale value and the gray scale value of all the surrounding pixels, or to the gray scale value that appears most often in the adjacent pixels.

This has the effect of attenuating the gray scale values of high contrast pixels without completely removing that contrast. Thus, the image takes on a less sharp and more gradually changing appearance. This is very helpful in reducing small, high contrast noise such as a single bright pixel by diluting it with the surrounding pixels.

An example of a smoothing process in shown in the set of pixels in FIG. 10. The aberrant center pixel with a gray scale value of 28 is altered by averaging it with the surrounding pixels. Thus, its altered value would be:

$$\frac{9+8+7+10+28+9+9+7+10}{9} = 11$$

The new gray scale value of 11 would blend quite closely with the surrounding pixels.

Alternatively, the aberrant pixel can be changed to match the gray scale value appearing most often in the surrounding pixels. In this example, that would be 9 since 9 appears three times. Other variations on this theme will be apparent to those skilled in the art.

Although the smoothing process is fairly effective in attenuating an aberrant pixel, it permits little effect by the aberrant pixel on its surrounding pixels. For example, the smoothing of the pixel with a gray scale value of 9, immediately to the right of the aberrant pixel with a gray scale value of 28, results in:

$$\frac{8+7+7+28+9+8+7+10+10}{9} = 10$$

The new value of 10 is only a single value from the original value of 9, and the resulting pixel will still blend closely with its neighbors. If the process changes the subject pixel to match the gray scale value appearing most often in the surrounding pixels, the new gray scale value would be 7, which would also blend closely with the surrounding pixels.

The invention may use an edge differentiation process in connection with several other processes. This process attempts to locate edges in the image by comparing the gray scale value of each pixel with that of the pixel diagonally adjacent. If the difference between the gray scale values of those two pixels exceeds a predetermined value, an entry is made in machine memory for that pixel, on the theory that the pixel indicates the edge of a contrasting element. As this process is applied to the entire screen, a "line drawing" showing the edges of each element is stored in machine memory. While the line drawing could be displayed if desired, it is primarily an intermediate step toward several other processes described below.

FIG. 11 shows schematically and much enlarged a set of pixels representing a circular element of dark pixels (represented as squares with "x"s) against a light background. The edge differentiation process will establish a line drawing in machine memory for the edge of the dark circle as it compares each pixel on the screen with the pixel diagonally adjacent, such as the pixel immediately to the lower right. It is evident from FIG. 11 that this process works well for the entire circle except in regions 101 and 103. In those regions, the pixels immediately to the lower right of the pixel being examined are not different in gray scale value from the pixel being examined, even though those pixels do indeed form an edge. This shortcoming will occur whenever the direction of the element edge is approximately parallel to the diagonal line between the pixel being examined and the comparison pixel. However, since most lines in ultrasound imaging are curved, this will occur only for short distances.

The invention may also use, alone or in combination with the other processes described herein, contrast enhancement and edge enhancement processes. The contrast enhancement process increases or decreases the gray scale value of each pixel based upon a multiple of the absolute difference in gray scale between the pixel and the average of the surrounding pixels. For example, if the average gray scale value of the surrounding pixels is 20 and the examined pixel has a gray scale value of 17, then the gray scale value of the surrounding pixel will be altered accordingly to the formula:

$$Pe = P - (Ps - P) K$$

Where
Pe = enhanced gray scale value
P = original gray scale value
Ps = average gray scale value of surrounding pixels
K = multiplier constant If the multiplier constant is 1 in the example, then:

$$Pe = 17 - (20 - 17) (1)$$

$$Pe = 14$$

It is evident that the contrast can be further enhanced by choosing larger multipliers. If the multiplier is 2, then:

$$Pe = 17 - (20 - 17) (2)$$

$$Pe = 11$$

If the gray scale value of the examined pixel is greater rather than less than the average gray scale value of the surrounding pixels, then the absolute difference between the two, times the multiplier, is added rather than subtracted from the original gray scale value. For example if the average gray scale value of the surrounding pixels is 20 and the gray scale value of the examined pixel is 23, then $$Pe = P + (P - Ps) K$$

$$Pe = 23 + (23 - 20) (1)$$

$$Pe = 26$$

The degree of contrast enhancement can be changed by using alternative multipliers, as in the case where the gray scale value of the examined pixel was less than the average of the surrounding pixels.

The edge enhancement process either lightens or darkens an edge pixel based on its relation to the adjacent pixel that is not on the edge. The machine first examines each pixel in comparison to a pixel diagonally adjacent to it to determine whether the examined pixel is part of an edge. If the difference in gray scale values between the examined pixel and the diagonally adjacent pixel exceeds a predetermined value, then it is presumed the examined pixel is an edge. This portion of the process is similar to the edge differentiation process described above and, in fact, the line drawing results of the edge differentiation process may be used to limit the number of pixels being examined in this process.

The process then alters the examined pixel based upon the amount of difference between the examined pixel and the diagonally adjacent pixel. That difference is assigned a modifier number from a table of modifiers, which is added to the examined pixel if the examined pixel is larger than the diagonally adjacent pixel and is subtracted from the examined pixel if the examined pixel is less than the diagonally adjacent pixel. For example, if the examined pixel has a gray scale value of 20 and the diagonally adjacent pixel has a gray scale value of 15, then the difference is 5. The number 5 is looked up in the table of modifiers and the corresponding modifier number is added to the original gray scale value of 20. If, instead, the diagonally adjacent pixel had a gray scale value of 25, then the difference would still be 5 and the modifier would still be the same. However, the modifier would be subtracted from rather than added to the original gray scale value, since the gray scale value of the examined pixel was less rather than more than that of the diagonally adjacent pixel.

The table of gray scale value modifiers can be chosen by several means. It can be a linear function of the differences between gray scale values between the examined pixel and the diagonally adjacent pixel, which will result in a fairly uniform enhancement of edges. Alternatively, it can emphasize edges in dark regions or in light regions. The table can be changed among modifier sets by an experienced image analyst depending on conditions.

Figure 12:
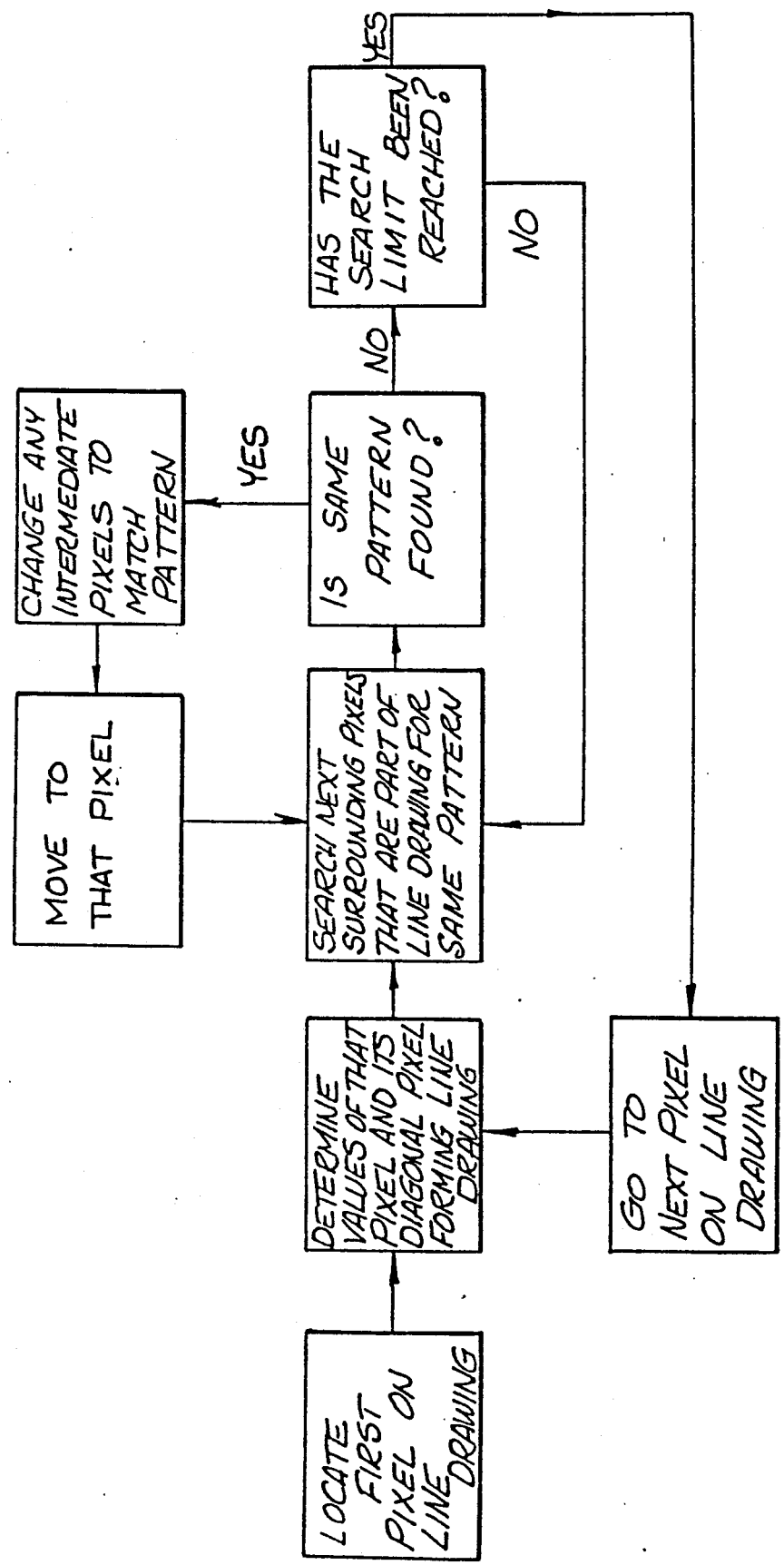
FIG. 12 is a diagrammatical representation of the contour following process of an embodiment of the invention.

One of the processes using the line drawing of the edge differentiation process is a contour following routine, depicted in FIG. 12. The machine examines a pixel that produced an entry in the line drawing in machine memory and its diagonally adjacent pixel. The machine then examines the eight surrounding pixels to determine whether any of them are part of a similar pattern. For example, if the pixels that produced an entry in the line drawing were a pixel with a gray scale value of 14 and a pixel immediately to the lower right with a gray scale value of 32, then the machine will search the adjacent pixels for a pixel with a gray scale value of 14 and a pixel with a gray scale value of 32 immediately to the lower right of such pixel. If the machine finds the 14 and 32 pattern, then the machine moves to the 14 pixel and examines its surrounding pixels (less the surrounding pixel that was already examined) in search of a similar pattern, and so on. As the process continues, the contour of a contrasting element is gradually established. Although the process could look at every pixel surrounding the examined pixel in search of the appropriate pattern, the process is materially faster using the line drawing in machine memory to indicate which pixels are candidates for the search.

The contour following process is likely to be frequently interrupted by noise in the image that may disguise the pattern of gray scale value changes in surrounding pixels characteristic of the contour. When that occurs, and the machine is unable to detect the pattern in any of the pixels immediately surrounding the last pixel that was part of the desired pattern, then the machine expands the search to the next surrounding pixels. If none of those pixels are part of the desired pattern, then the machine may expand the search still further to the second next surrounding pixels. If the machine finally locates the desired pattern in the expanded search, then it will continue searching for the desired pattern from that point. A modification of this process permits a predetermined variation in the gray scale pattern. In the example of a 14 and 32 pattern, the process would recognize the pattern not only in pixels of 14 and 32 gray scale value but also, for example, in pixels of 13 and 33, 15 and 33, or similar variations within predetermined limits.

The pixels that were the subject of the expanded search in a line between the pixels showing the desired pattern, are assumed to be distorted by noise. Thus, the machine alters pixels in that line to match the desired pattern which is evident on each end of the line.

The expanded search that occurs when the machine fails to locate the desired pattern in any immediately adjacent pixels could, theoretically, continue for any number of pixels in ever-expanding layers. However, it has been found that the practical limits of the expanded search in medical ultrasound is about three layers of pixels. Beyond that, the results are less useful and an inordinate amount of processing time is required.

A pattern recognition routine may be used to identify characteristic element shapes and, if desired, to substitute exact computer-generated shapes for image shapes that are within predetermined limits of the computer-generated shapes. The process begins by creating a bit stream pattern of "1"s and "0"s for each enclosed line in the line drawing produced by the edge differentiation process. A "1" is entered each time the next pixel on the line drawing is between 0° and 180° on a "compass" the north axis of which is the line between that pixel and the preceding pixel on the line drawing. A "0" is entered if the next pixel on the line drawing is between 180° and 360° on that compass. The compass is initially oriented with the north axis pointing through the first pixel on the line drawing and toward the top of the image in order to establish the compass location of the second pixel on the line drawing. The process moves along the line drawing pixel by pixel in this fashion, entering either a "1" or a "0" for each pixel. When the line drawing element closes and the machine is back to the original pixel, a bit stream pattern has been established for that element. The machine then does the same for the next closed element.

The machine has in memory the bit stream patterns for a set of characteristic shapes, such as common tumor shapes, tissue shapes and organ shapes. By comparing the bit stream patterns of those characteristic shapes with the bit stream patterns of the closed elements in the image, the machine can identify those elements. If desired, the machine can also substitute the characteristic shape from memory for the actual shape in the image or superimpose one over the other for a visual comparison.

The process may allow a predetermined degree of mismatch between the database characteristic shape and the actual image element shape. This is achieved by requiring a bit stream pattern match up to only a predetermined threshold, such as 80%. The process also will account for size variations by comparing the database characteristic shapes to not only the actual image element shape, but also to the actual image element shape minus every, for example, fifth bit stream entry. This sizing process is achieved by establishing a ratio of the smaller of the two midstream patterns to the larger (i.e. 10/20) where 10 is the smaller number of bits in the pattern. This would then remove every other bit from the larger bit pattern so as to make exact shape comparisons possible.

As explained above, any combination of the processes described may be used together and in conjunction with an image comparison process. That process compares information from a subject image with corresponding information from seven or some other predetermined number of successive images. The process operates on the theory that noise which may distort the image, and hence distort the results of the processes described herein, is random and short-lived. By comparing a set of consecutive images, it can be predicted whether gray scale variations actually correspond to physical elements or are merely noise. If a certain phenomena appears in a number of consecutive images, it is not short-lived and random and is, therefore, probably not noise.

Existing methods in the art have used image comparison techniques, but not to the extent or in the manner of this invention. In particular, existing methods generally compare only pixel gray scale variations. This invention, instead, compares the results of the processes described herein among consecutive images. Rather than simply changing a pixel based on its value in successive images, this invention will change the results of a process such as, for example, the line drawing of the edge differentiation process, based on the line drawing of successive images. That change will, in turn, require a change in the image pixel gray scale value.

The image comparison process utilizes a circular image buffer with a set of pointers to minimize the data transfer requirements. For a comparison system using one subject image and seven successive images, the buffer would contain eight blocks representing a block for each image. For example, the subject image would be in block 1 with the display pointer on that block and the others would be in blocks 2 through 7 with processing pointers on those blocks. When a new image is ready for display, the eight images would not shift one block each. Instead, the display pointer would simply move to block 2 and a processing pointer would move to block 1. Block 1 would be filled with the new image, which would be the eighth successive image in this example.

In its simplest application, the image comparison process compares the gray scale value of each pixel with the gray scale value of the same pixel in the seven successive images. The machine may then modify the gray scale value of the subject pixel based on an averaging, a majority or supra majority vote or some other formula that considers the gray scale values of the pixel in the successive images. More complex applications of the frame comparison include the use in combination with the edge differentiation and contour following processes and in the other processes described.

The edge differentiation process can also be used in combination with a process of successive image comparisons. The individual elements of the line drawing of a given image being processed is compared to that of, for example, seven successive images. The image being processed may be altered so that its line drawing more closely resembles that of the seven successive images. The exact alteration determination can be by a number of methods. For example, the image being processed may be altered so that its line drawing matches a majority of the line drawings of the seven successive images, or matches a supra majority of them.

The frame comparison process resulting from the line drawing procedure can also be performed in combination with the contour following process. Under that combination, the line drawings forming the basis for comparison among the image being processed and the seven successive images are those that reflect the changes made by the contour following process.

Once an image has been processed, the resulting information can be used to color the image to set off desired features. The coloring may be of the echoic texture using a color spectrum from red to blue representing portions of the echoic texture scale. The coloring may also be of the reflectivity which corresponds to the lightness of various regions. It has been found that a convenient color scheme uses a spectrum similar to that of Computerized Axial Tomography (CAT) wherein blue represents light regions and red represents dark regions.

What is claimed is:

1. A method for analyzing a body tissue ultrasound image including a plurality of discrete image pixels, comprising:
    (a) determining the distribution of gray scale values in the pixels of an examined window of pixels by application of an iterative formula at each gray scale value in the examined window, in which the distribution varies in proportion to the number of pixels having that gray scale value and in inverse proportion to the average gray scale value in the examined window
    (b) assigning a value as the echoic texture of said examined window from a numerical scale corresponding to the gray scale distribution in said examined window, wherein one end of the scale corresponds to a narrow distribution range and the other end of the scale corresponds to a broad distribution range; and
    (c) relating said numerical value to numerical values previously determined for a variety of compositions in order to predict the character of elements depicted in the examined window.

2. The method of claim 1, wherein said average pixel gray scale values are theoretical peaks determined by averaging only those significant pixel gray scale values that have more than a predetermined percentage representation on the window and by rounding the averaged number to the nearest integer.

3. The method of claim 2, wherein said step of measuring the pixel gray scale value distribution is accomplished according to the iterative formula:

$$\text{Slope} = \text{Slope}\,(i-1) + \frac{\text{Pop}\,((P-i)+1)}{N}$$

Where
  Slope = Distribution at Gray Scale value $i-1$, using 0 at Initial Gray Scale Value
  Pop = Number of Pixels at Gray Scale Value
  i = Gray Scale Value
  N = Number of significant Pixels in Examined Window
  P = Theoretical Peak of Examined Window until and including i=theoretical peak, and after that according to the formula:

$$\text{Slope} = \text{Slope}(i-1) = \frac{\text{Pop}/((1-P)+1)}{N}$$

until and including the last significant gray scale value in the examined window.

4. The method of claim 3, wherein the echoic texture is obtained by the formula:

$$T = \text{Slope}(P_m - P)K$$

where
  T=Echoic Texture
  Slope=Distribution after Application of Distribution Formula
  $P_m$=Theoretical Peak for Comparison Window
  P=Theoretical Peak for Examined Window
  K=Constant 5. The method of any claim 1 through 4 further comprising:
  (a) converting analog pixel signals proportionate to pixel gray scale values to digital pixel signals on a predetermined gray scale prior to determining the gray scale value distribution in the examined window;
  (b) performing the steps described for assigning an echoic texture value to an examined window, for a plurality of examined windows in the image; and
  (c) displaying the assigned echoic texture on an least two dimensional image corresponding to the image being analyzed, wherein areas of different echoic textures are assigned predetermined different colors.

* * * * *